Feb. 9, 1971 W. W. GARSTANG 3,561,085
METHOD OF MAKING AN ALLOYED METAL OXIDE CAPACITOR
Filed June 13, 1968
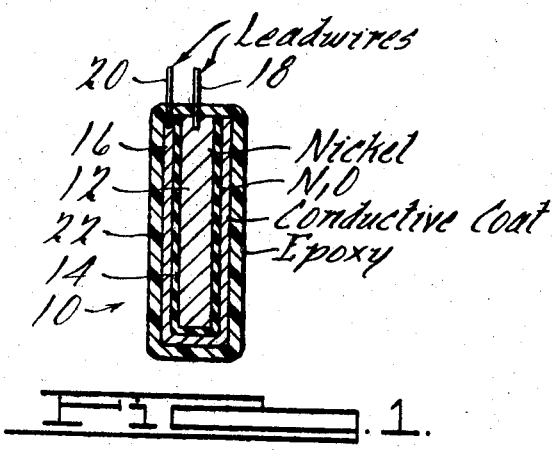
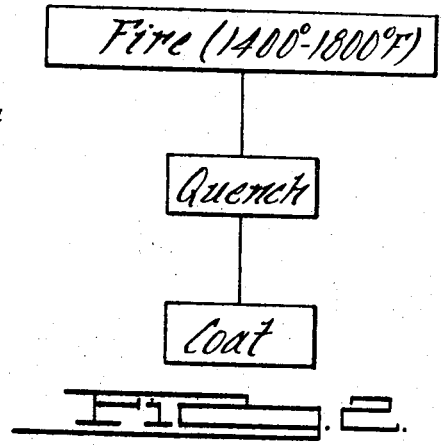
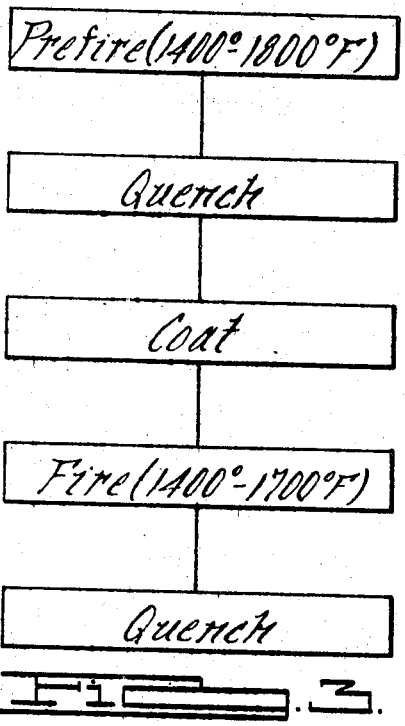
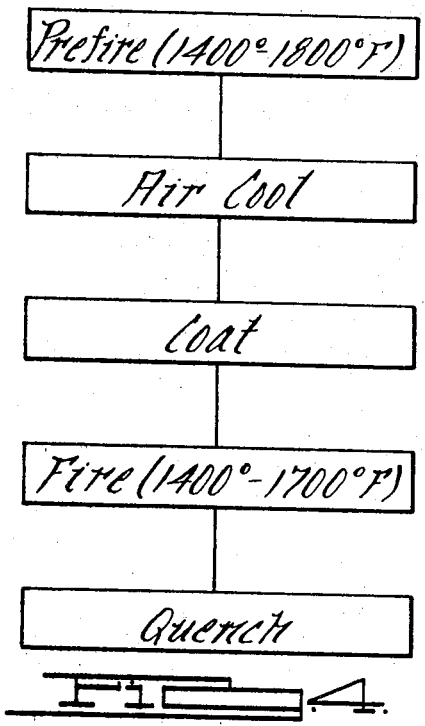
INVENTOR.
William W. Garstang
BY
Harness, Dickey & Pierce
ATTORNEYS _United States Patent Office_

3,561,085
Patented Feb. 9, 1971

3,561,085
METHOD OF MAKING AN ALLOYED METAL OXIDE CAPACITOR
William W. Garstang, Belgium, Wis., assignor to Syncro Corporation, Oxford, Mich., a corporation of Michigan
Filed June 13, 1968, Ser. No. 736,672
Int. Cl. H01g 3/07
U.S. Cl. 29—25.41                               7 Claims

ABSTRACT OF THE DISCLOSURE

A novel construction for a nickel oxide capacitor including the use of a novel alloy and a novel method of manufacturing a nickel oxide capacitor.

BACKGROUND SUMMARY OF THE INVENTION

The present invention relates to metal oxide capacitors and method of manufacturing the same and specifically to the structure and manufacture of nickel oxide capacitors.

In some processes for manufacturing a metal oxide capacitor, a coating of a permeable silver paint is applied to the base metal and then the metal is fired at a relatively high temperature at which an oxide film is formed underneath. This process has been suggested for use with other metals including nickel. In the application of the process, it has been suggested that substantially pure nickel be used. It has been found that it is advantageous, in fact, to use an impure form of nickel and specifically a nickel having a titanium content therein.

At low firing temperatures (between around 700°–1000° F.) a nickel oxide, $Ni_2O_3$, forms which is undesirable for a dielectric. At a temperature of from around 1400–1800° F. a nickel oxide NiO is formed having a desirable lattice structure which is a good dielectric. It has also been found that after firing the nickel to form NiO a rapid quench will provide a superior dielectric to a slow, air cooled quench.

By use of the above process steps and by including the use of the novel form of nickel, i.e. alloy, an improved process and product have been provided. Therefore, it is an object of the present invention to provide a new and improved process for the manufacture of nickel oxide capacitors.

It is another object to provide a new and improved nickel oxide capacitor construction.

It is still another object of the present invention to provide for a new and improved nickel oxide capacitor construction utilizing an impure form of nickel.

It is another object of the present invention to provide a new and improved nickel oxide capacitor utilizing a nickel alloyed with titanium.

It is still another object of the present invention to provide a novel process utilizing the impure form of the nickel as previously noted in the preceding objects.

It is still another object of the present invention to provide a new and improved process for the manufacture of nickel oxide capacitors in which the article is fired and rapidly quenched.

Other objects, features and advantages of the present invention will become apparent from the subsequent description and the appended claims, taken in conjunction with the accompanying drawings, in which:

FIG. 1 is a pictorial, sectional view showing a nickel oxide capacitor of a form of the present invention;

FIG. 2 is a block diagram showing one sequence of steps of the present invention;

FIG. 3 is a block diagram showing another sequence of steps of the present invention; and FIG. 4 is a block diagram showing still another sequence of steps of the present invention.

In the process used, it has been found advantageous to use an impure form of nickel, i.e., approximately 97% pure. When the nickel is alloyed with between .2 and 3% of titanium, a superior nickel oxide capacitor has resulted. The titanium acts to increase the oxidation rate of the nickel and hence provides for a better resultant nickel oxide dielectric layer; in addition the titanium dioxide formed from the titanium has good dielectric characteristics. It is desirable that the content of harmful components such as silicon be maintained at a minimum, i.e., in total no greater than around 1.2%. The silicon content should be preferably no greater than .05%. In one preferred form an improved nickel oxide capacitor was obtained having the following analysis: silicon .05, manganese .10, copper .02, iron .02, aluminum .04, magnesium 1.0 and titanium 1.0 with the remainder being nickel. Preferably the total content of impurities aside from titanium should be less than 1.2%. With a composition as noted above a nickel oxide capacitor having a capacitance of 400 picofarads at 25° C., was formed having a low dissipation factor (.1%) at 1 megahertz and at 25° C. With a titanium content of less than around .2% little improvement would be realized. With a titanium content greater than around 3% little improvement would be realized and in fact degradation of the capacitor could occur.

Looking now to FIG. 1, in the nickel oxide capacitor 10 the center conductor or electrode 12 is the nickel alloy noted above. The dielectric 14 is the compounds formed by oxidation of the alloy in accordance with the present process with the compounds being substantially nickel oxide NiO which has good dielectric properties. A conductive coating 16 is located on the dielectric 14 and lead wires 18 and 20 are connected to the center electrode 12 and outer electrode or coating 16, respectively. The entire structure, except for extensions of lead wires 18 and 20, is encapsulated in a suitable coating 22 such as epoxy. Note that the nickel oxide, NiO, is formed; the other oxides of nickel, $Ni_2O_3$ are not desirable and are avoided in the dielectric coating. The desired nickel oxide, NiO is formed at high temperatures preferably in the range of from 1400° to 1800° F.

As previously noted, it has been suggested that the nickel oxide capacitor 10 be made by first coating a nickel tab or sheet with an oxygen permeable silver coat and then firing in order to form the nickel oxide. In the present invention it has been found that a superior dielectric and hence a superior capacitor can be made by forming the high temperature form of nickel oxide dielectric (NiO) either prior to or both before and after coating. Thus in the present invention, in the first step (see FIG. 2) the nickel tab is heated to a temperature of approximately 1400° to 1800° F.; in one form of the invention the tab is heated at 1650° F. for two hours. This firing is preferably done in an oxygen rich atmosphere, and at this temperature, the green high temperature oxide, NiO, is formed. It has been found that if the heated tab is allowed to cool slowly an inferior dielectric results; however, if the tab, while at the elevated temperature, is quenched rapidly a good dielectric results. It has been found that quenching the tabs is not more than around five seconds from the time the units are cherry red until essentially they are at a temperature in the order of around 500° F. produces satisfactory results.

While satisfactory quenching can be obtained by placing the hot tab on a heat sink, such as a relatively large mass of iron, it has been found advantageous to quench the tabs by immersing them into a liquid bath such as DC 200 silicon oil. The bath should be inert, should not form a reducing or oxidizing agent, and should have good thermal conductivity. A particularly advantageous bath has been found to be perchlorethylene which in addition to the prior characteristics appears to form a gas around the tabs as they are cooled thereby providing a protective environment preventing oxidation or reduction of the high temperature NiO. After quenching it is possible to apply a conductive coating, such as silver, to the NiO surface resulting in a satisfactory capacitor (see FIG. 1). However, in the preferred form additional firing steps are taken.

It may be that the dielectric coat requires repair and/or further conversion to the high temperature NiO. In this event additional steps can be taken (see FIG. 3). After the prefiring and rapid quenching in perchlorethylene (similar to the first two steps of FIG. 2), an electrode of silver and palladium mixed with a frit, which is an oxygen donor, is applied to the NiO surface with the silver being permeable to oxygen. The frit can be the trioxide of bismuth. The coating is dried at around between 300–500° F. at which temperature the volatiles are removed from the electrode coating. The tab is then fired at a temperature in the range of around 1400° F. to 1700° F. for a time period ranging between ten minutes and two hours depending upon the results desired and the characteristics of the particular frit system used. At the time the frit has fused and imperfections in the dielectric coating have been healed; next the coated, heated tab is rapidly quenched in perchlorethylene (similar to prior step 2). The above process steps are preferred and in general result in a better dielectric (see FIG. 3) then that resulting from the process steps of FIG. 2.

In an alternate process (see FIG. 4) the nickel tab is prefired in an oxygen rich atmosphere (similar to step 1 of FIG. 2) to a temperature in the range of around 1400° F. to 1800° F. The tabs are then allowed to slowly cool in air. Next, the silver and palladium mixed with frit are applied to the surface (the frit having an oxygen donor), with the silver coat being permeable to oxygen and the coated tab is fired again in an oxygen rich atmosphere to a temperature in the range of around 1400° to 1700° F. for around seventy minutes. It is believed that oxygen permeates through the silver coating and also is obtained from the frit for forming NiO. Now the tab is rapidly quenched, preferably in the liquid perchlorethylene bath resulting in the improved dielectric.

In some instances it may be desirable to impregnate the tabs. In using the DC 200 silicon oil as a quench, impregnation was provided by applying a slight vacuum, i.e., in the order of 200 microns, with the tabs in the oil for approximately twenty minutes. Next the lead wires 18 and 20 are applied to electrodes 12 and 16, respectively. In the final step, the device is encapsulated in a coat 22 by multiple dips in an epoxy to further reduce moisture sensitivity. The result is an improved capacitor construction and a novel method for making the same.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. The method of making a nickel oxide capacitor comprising the steps of: heating a nickel member in the presence of oxygen to form NiO on the surface of the nickel member, cooling the heated nickel member and applying an outer electrode on the surface of the NiO, said nickel member being a nickel alloy consisting essentially of nickel and of titanium in the range of from about .2% to around 3%.

2. A method of making a nickel oxide capacitor in accordance with the steps of claim 1 and, prior to the heating step of claim 1, further comprising the steps of heating the nickel member in the presence of oxygen to a temperature of between around 1400° F. to around 1800° F. and applying the outer electrode comprises coating the NiO surface with an electrically conductive coating.

3. The method of claim 2 with the coating being permeable to oxygen.

4. The method of claim 2 with the cooling step being a duration of approximately less than around five seconds.

5. The method of claim 1 with the nickel member being a nickel alloy consisting essentially of nickel and titanium in an amount of about 1%.

6. The method of claim 5 further comprising the steps of coating the NiO surface after the cooling with a conductive coating on the NiO surface with the coating being permeable to oxygen, heating the coated member in the presence of oxygen to a temperature of between around 1400° to around 1700° F. and quenching the heated nickel member rapidly.

7. The method of claim 6 with the duration of the cooling and quenching being approximately less than around five seconds.

References Cited

UNITED STATES PATENTS

| | | | |
|---|---|---|---|
| 1,709,427 | 4/1929 | Bush | 317—230 |
| 1,924,606 | 8/1933 | Hammond | 317—231X |
| 1,966,297 | 7/1934 | Jackson | 317—230 |
| 2,504,178 | 4/1950 | Burnham et al. | 317—230X |
| 3,028,447 | 4/1962 | Felaschen et al. | 317—230X |
| 3,353,124 | 11/1967 | Dilger | 317—258 |

JAMES D. KALLAM, Primary Examiner

U.S. Cl. X.R.

317—258